Patented May 9, 1933

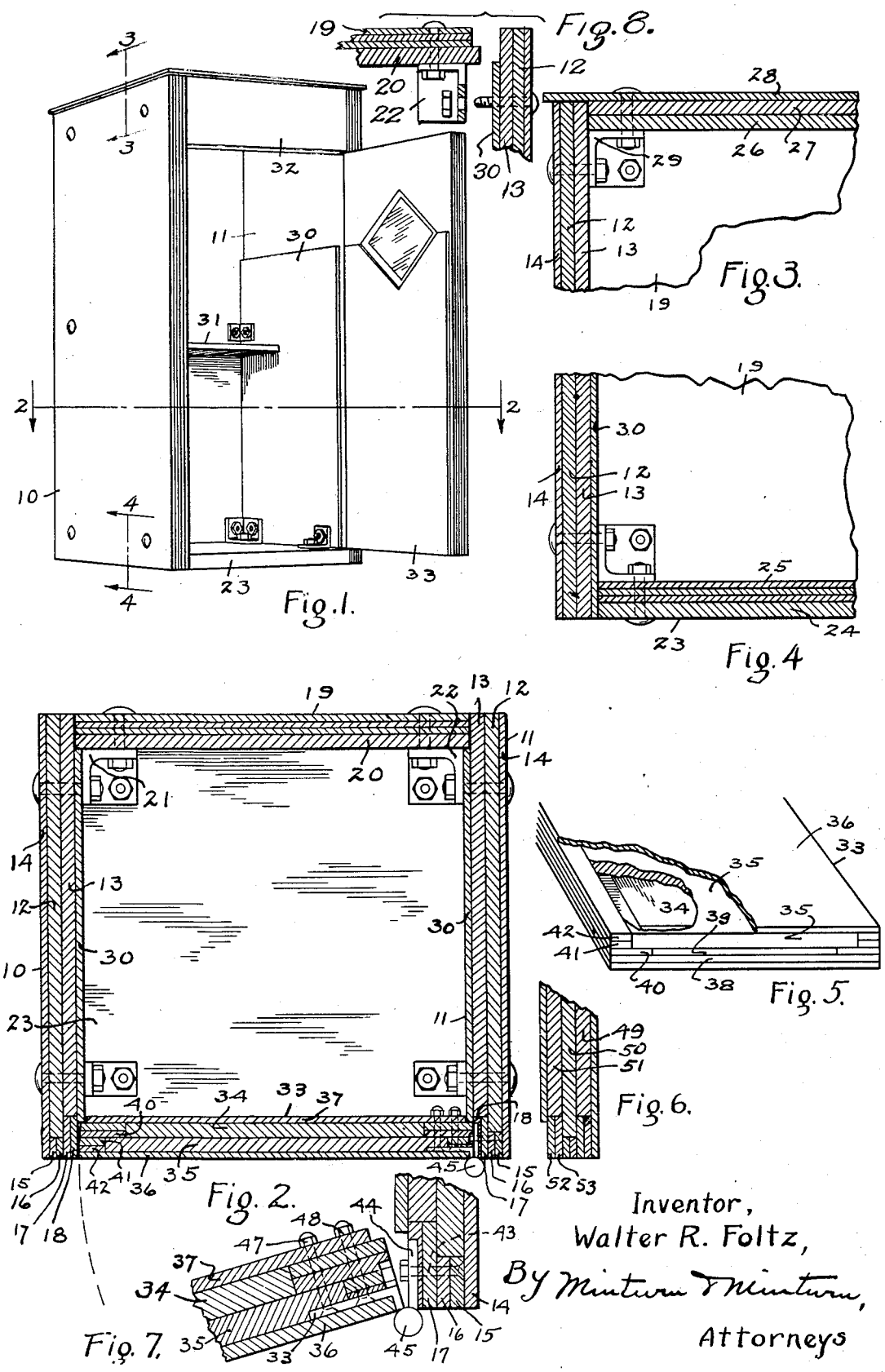

1,908,661

UNITED STATES PATENT OFFICE

WALTER E. FOLTZ, OF INDIANAPOLIS, INDIANA

SOUNDPROOF BOOTH

Application filed May 5, 1931. Serial No. 535,221.

This invention relates to the art of sound proof booths such as may be employed for telephone booths.

One of the primary objects of the invention is to form walls and joints therebetween built up in such a manner that the transmission of sound therethrough is practically eliminated.

A further important object of the invention resides in the particular manner of assembly of the various walls to form the booth.

A further important object of the invention resides in the particular method of utilizing the same material but with varying degrees of density to provide rigid framing about the resilient, absorbent filling.

A still further important object of the invention resides in a particular method of hanging the door on the booth so as to prevent the conducting of sound through metal parts.

These and other objects will become apparent in the following description of the invention as illustrated in the accompanying drawing, in which Fig. 1 is a front perspective view of a booth embodying my invention;

Fig. 2, a horizontal transverse section on the line 2—2 in Fig. 1 on an enlarged scale;

Fig. 3, a section through an upper corner of the booth on the line 3—3 in Fig. 1;

Fig. 4, a section through a lower corner of the booth on the line 4—4 in Fig. 1;

Fig. 5, a detail in fragmentary perspective view of an end of the door;

Fig. 6, a detail in fragmentary horizontal section of a modified form of booth wall;

Fig. 7, a detail in transverse section of the door hinge mounting; and

Fig. 8, a detail in transverse section of a rear and side wall corner with the walls in separate relation.

Like characters of reference indicate like parts throughout the several views in the drawing.

I preform the walls and door of the booth and then assemble them as units. The two side walls 10 and 11 are symmetrically formed and each has two central layers 12 and 13 of a fiber like material, the two layers being preferably glued one to the other. The material employed to form the layers 12 and 13 is a ground wood fiber pressed together without the use of a binder to form sheets of substantial thickness, one particular thickness being $\frac{7}{16}$ of an inch. On the outer side of each of these walls 10 and 11 is placed a layer of material 14 entirely thereover and preferably glued thereto. This outer material 14 is of the same composition as that of the layers 12 and 13 but has been subjected to far greater pressure so as to have reduced it to a density exceeding that of most soft woods and to have much less thickness, as for example $\frac{3}{16}$ of an inch in comparison to the $\frac{7}{16}$ of an inch thickness of the layers 12 and 13.

While the outer layer of material 12 may be worked the same as wood, the less dense material forming the layers 12 and 13, while being worked with the ordinary carpenter's tools, is preferably provided with a finishing and reenforcing frame at its front edges in order to preserve a uniform door opening between the two side walls 10 and 11.

Referring to Fig. 2, each of the walls 10 and 11 has its front vetrical edge formed of a plurality of strips of material of the same density as that of the material 14. The layer 12 is cut back from its front vertical edge to provide a space to receive the two narrow strips 15 and 16. The layer 13 is cut back still further from its vertical edge than is the layer 12 to receive thereagainst the two wider strips 17 and 18. All of these strips 15, 16, 17 and 18 are preferably glued one to the other and are further nailed one through the other as well as through the overlapping edge of the layer 12 which, by reason of the strips 15 and 16 being narrower than the strips 17 and 18, laps over onto the strip 17.

The rear wall 19 is formed to have an inner thickness 20 of the less dense material and over its back face is successively glued a number of sheets of the denser material, here shown as three in number. Since the booth is generally positioned to have the rear wall 19 against a building wall, sound is generally cut off from the booth from the rear side to an appreciable extent and advantage is taken of this fact to employ two extra sheets of denser material to provide structural strength in place of a second layer of the less dense material. The rear wall 19 is formed to have the vertical edges of the layer 20 project slightly beyond the edges of the denser material therebehind as indicated in Fig. 8. These softer edges are allowed to project in order that when the wall 19 is placed between the walls 10 and 11 in assembling, the walls 10 and 11 may be drawn tightly against the vertical edges of the rear wall 19 so as to compressively engage it and compress the projecting edges of the layer 20 with the more solid edges of the denser material serving as stops, whereby a tight joint is secured between ends of the wall 19 and the two side walls 10 and 11.

These three walls are held together by means of angle plates 21 and 22 with bolts passed through them and the walls. No other connecting means is employed, the closeness of the joints between the walls being preserved by reason of the resilient ends of the layer 20 maintaining a closed joint therebetween.

The floor 23 of the booth is preferably formed to have a layer 24 of the less dense material on the underside and a plurality of layers of the denser material 25 on the upper side to provide the necessary structural strength and to give an upper dense wearing surface. The floor is secured between the lower ends of the three walls by means of angle plates and bolts passed through the walls and floor, the edges of the less dense material 24 projecting originally beyond the denser material 25 so as to be compressively engaged between the three walls.

The top of the booth is here shown as being formed of two layers 26 and 27 of the less dense material glued one to the other and a single sheet 28 of the denser material glued thereto and thereabove to project beyond the layers 26 so as to rest over the top edges of the walls 10, 11 and 19 with the layers 26 and 27 dropped downwardly therebetween and their edges compressively contacting with the sides of the three walls. Ordinarily this frictional engagement of the top is sufficient to retain it in place. However angle plates 29 with bolts passed through the side walls and top may be employed if it be desired to secure the top in place.

Within the booth I cover the inner sides of the walls 10 and 11 for about two-thirds of the distance from the floor with a layer 30 of the denser material merely to serve as a cover to prevent excessive wear of the softer layers 13 thereunder. A shelf 31 is here shown as being provided, on which a telephone and a writing pad (not shown) may be placed.

Referring now to the door of the booth, I preferably drop a header 32 from the top and between the side walls 10 and 11 for a short distance. The door 33 is preferably formed to have two central layers 34 and 35 of the less dense material and outer and inner layers 36 and 37 of the denser material glued one over the other to form a single panel. To reenforce and maintain the panel in a common plane, the vertical edges of the door are built up from layers of the denser material in the same manner as the front edges of the side walls 10 and 11, whereby both vertical edges of the door present edges entirely of the denser material. In addition to reenforcing the vertical edges of the door 33 with strips of the denser material, the lower edge, Fig. 5, of the door has the inner layer 34 of the less dense material cut back to receive the cross strips 38 and 39 which are glued and nailed one to the other and to the other adjacent strips and layers to tie the door together laterally. The ends of the transverse strip 38 lap over the ends of the vertical strips 40. The transverse strip 39 fills in between the ends of the vertical strips 40 and the layer 35 laps thereover between the vertical strips 41 and 42. Particular attention is directed to the mounting of the hinges which support the door 33 from the wall 11. In the building up of the wall 11, bolts 43 are passed through the strips 15, 16, 17 and 18 and the outer dense sheet or layer 14 passes over the heads of these bolts. The strip 18 is morticed around the bolts 43 to receive the plate 44 of the hinge 45 therein. In forming the door 33, the plate 46 of the hinge is sunk to be flush with the surface of the less dense layer 35 across the end strip and bolts 47 and 48 having counter-sunk heads passed through the plate and on through the door and the outer layer 36 is continued over the plates 46 to completely cover them so that the only exposed part of the hinge 45 is the hinge pin with its engaging bands which extend from the two plates.

While the above indicated construction is suited for most installations, in factories where the noise of machinery is encountered, it may be desirable to use three layers, 49, 50 and 51, Fig. 6, of the less dense material in place of the two layers in side walls, top and door of the booth. In this case the edge of the wall or door is provided with additional strips 52 and 53 which fill in over the vertical edge of the layer 51.

While I have here shown and described my invention in the best form as now known to me, it is obvious that structural changes may be made without departing from the spirit of the invention, and I, therefore, do not desire to be limited to that precise form nor any more than may be required by the following claims.

I claim:

1. For a sound proof booth, a laminated wall formed of a plurality of layers of compressed fibrous material some of which layers are compressed to greater density than the others, and a reenforcing edge formed of a plurality of strips of varying widths of the same material but compressed to have a greater density covering the edges of the less dense material.

2. A sound proof booth having preformed walls built up with layers of compressed fibrous material some of which layers are compressed to greater density than the others, the edges of said walls having an edge of a layer of said material in less dense form compressively contacting a layer of like less density of the side of the next cornering wall, and bolt means for securing the walls one to the other at the corners.

3. In a sound proof booth, a side wall built up from superimposed layers of relatively thick compressed fibrous material and of the same material compressed to a greater density, a rear wall having a layer of the fibrous material and a layer of the same material compressed to a greater density, the less dense layer of the rear wall having its vertical edge projecting somewhat beyond the denser layer, and the rear wall having the vertical edge of the less dense layer abutting the less dense side face of the side wall, and means for drawing the side wall compressively against said rear wall vertical edge to compress said vertical edge thereagainst, the edge of said denser layer limiting the compression of the less dense edge.

4. A knock-down sound proof booth comprising side and rear walls, a top and a bottom, and a door hinged to one of the sides, all of said members being preformed and made of superimposed layers of compressed fibrous material, a finish layer of the material compressed to a greater density on the outside of the walls and door, the side walls and the door having a plurality of overlapping strips of the denser material inserted in the vertical edges, and hinges supporting the door having their leaves covered over by layers of said material when the door is closed.

5. A knock-down sound proof booth comprising side and rear walls, a top and a bottom, and a door hinged to one of the sides, all of said members being preformed and made of superimposed layers of compressed fibrous material, a finish layer of the material compressed to a greater density on the outside of the walls and door, the side walls and the door having a plurality of overlapping strips of the denser material inserted in the vertical edges, and hinges supporting the door having their leaves covered over by layers of said material when the door is closed, the rear wall being formed to be inserted between the rear vertical ends of the side walls and adapted to have its vertical edges compressively engaged by the inner faces of the side walls, and angles for securing the walls together at the corners.

In testimony whereof I affix my signature.

WALTER R. FOLTZ.